United States Patent [19]

Isaacson

[11] 4,153,037
[45] May 8, 1979

[54] SOLAR COLLECTOR MODULE AND SOLAR COLLECTOR SYSTEM

[76] Inventor: Boris Isaacson, 14532 Vanowen St., Van Nuys, Calif. 91405

[21] Appl. No.: 817,559

[22] Filed: Jul. 21, 1977

[51] Int. Cl.² ............................. F24J 3/02; F28F 3/14
[52] U.S. Cl. ..................................... 126/270; 126/271; 165/170
[58] Field of Search ................. 126/270, 271; 165/170

[56] References Cited

U.S. PATENT DOCUMENTS

| B 512,745 | 1/1976 | Deminet et al. | 126/271 |
|---|---|---|---|
| 3,107,052 | 10/1963 | Garrison | 126/271 |
| 3,215,134 | 11/1965 | Thomason | 126/271 |
| 3,893,506 | 7/1975 | Laing | 126/271 |
| 4,008,708 | 2/1977 | Hagarty | 126/271 |
| 4,062,346 | 12/1977 | Rapp | 126/270 |
| 4,062,351 | 12/1977 | Hastwell | 126/271 |

FOREIGN PATENT DOCUMENTS

| 2651847 | 5/1977 | Fed. Rep. of Germany | 126/270 |
|---|---|---|---|
| 2298067 | 8/1976 | France | 126/271 |
| 2302489 | 9/1976 | France | 126/271 |

Primary Examiner—John J. Vrablik
Attorney, Agent, or Firm—I. Morley Drucker

[57] ABSTRACT

The invention is directed to an easily fabricated, lightweight, solar collector module, and to a system for employing a plurality of said solar collector modules to achieve an efficient, relatively low cost method and means of collecting solar energy. The solar collector system comprises, preferably, a plurality of the lightweight, easily portable, module units which may be affixed to the roof of a house or other structure, in shingled fashion. Each of the modular units comprises, preferably, a pair of small-sized rectangular glass, or plastic, plates maintained in an offset, spaced relationship one above the other, by relatively small, glass, spacer support means. The normally upper surface of the lower plate of the unit is provided with a plurality of parallel grooves over a major portion of its surface. A plurality of such modular units are placed onto the roof of a structure, and rendered fluid-tight with respect to each other. The parallel grooves form a plurality of substantially continuous parallel fluid-carrying channels commencing from an upper entrance area and terminating in a lower exiting area. Fluid, which may be water or air, is pumped through the continuous space formed between the modular units and, is efficiently heated by the solar energy impinging upon the modular units.

21 Claims, 3 Drawing Figures

U.S. Patent      May 8, 1979      4,153,037
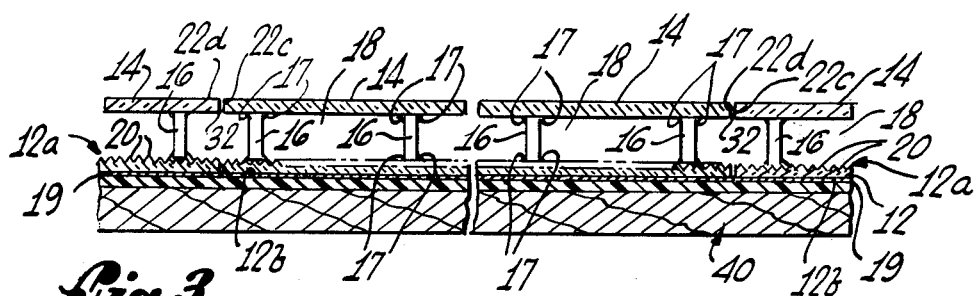
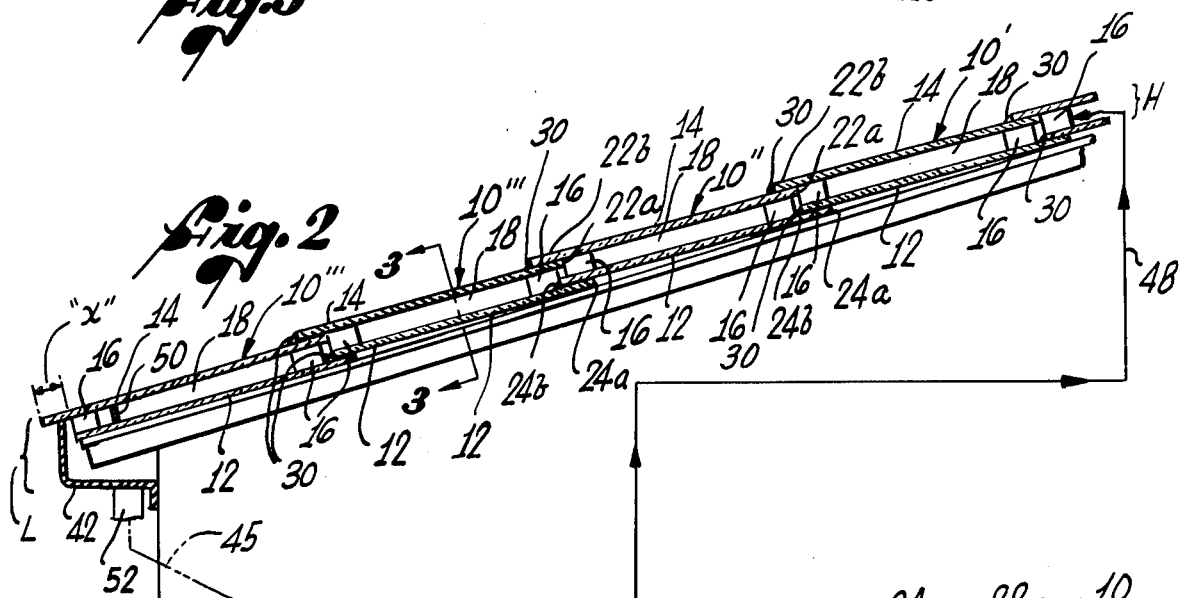
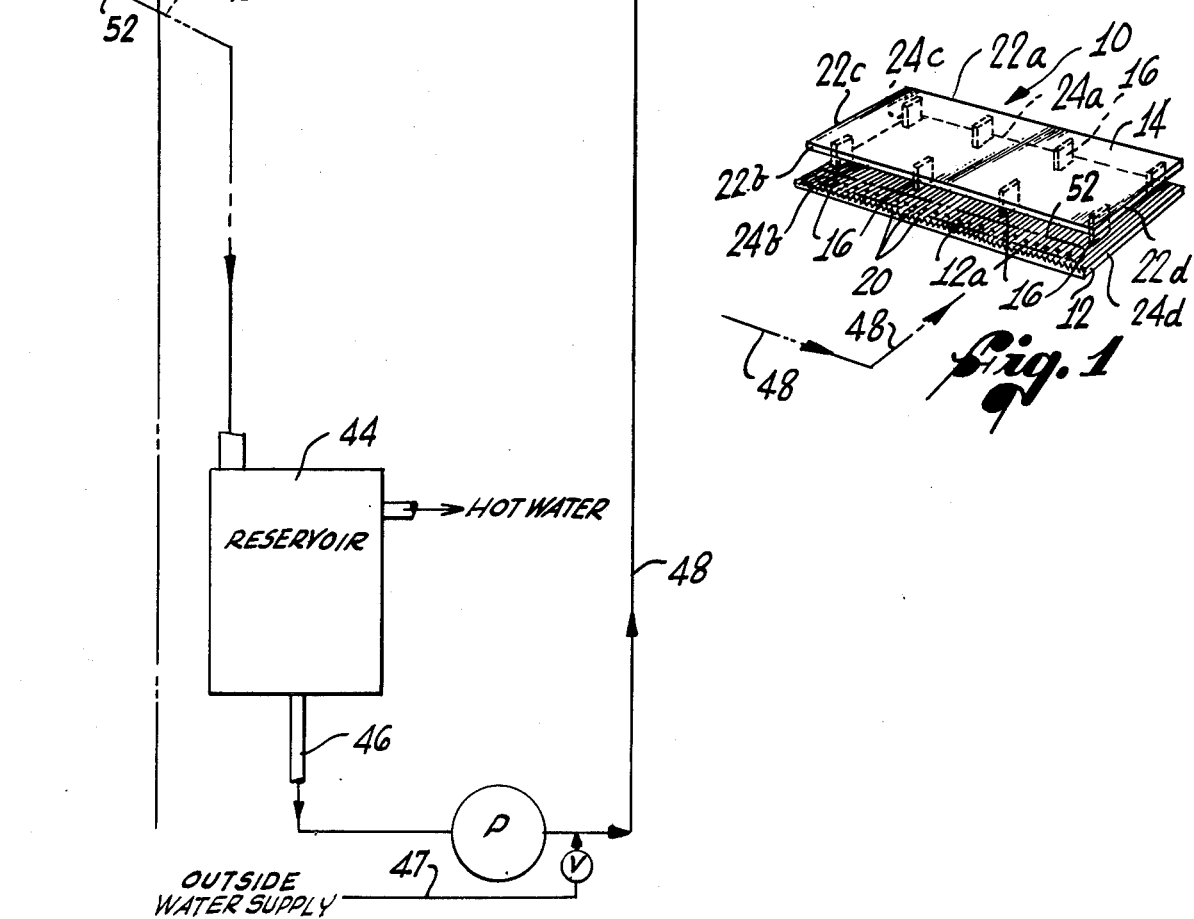

SOLAR COLLECTOR MODULE AND SOLAR COLLECTOR SYSTEM

BACKGROUND OF THE INVENTION

Solar collector panels are known, for roof top or other installation in which solar energy is caused to collect within the panel and raise the temperature of water passing in pipes therethrough. These panels are usually large, very heavy and cumbersome to work with. They are relatively expensive to manufacture because of the required piping and associated rigid housing structure therefor. Furthermore, substantial clear span area on a roof structure is required, and projections in the roof, such as roof vents, antenna mast, dormer windows and the like, frequently present substantial difficulty in laying out an optimum system for solar energy collection.

It is among the major objects of this invention, therefore, to design an efficient solar collector system for roof structures and the like, which is easily portable, inexpensive to fabricate, inexpensive to install, and which does not require large clear-span areas.

SUMMARY OF THE INVENTION

The solar collector system of this invention comprises, preferably, a plurality of lightweight, easily portable module units which may be affixed to the roof of a house or other structure, in shingled fashion, for the purpose of collection of solar energy. Each of the modular units comprises, preferably, a pair of rectangular glass, metal or plastic sheets or plates maintained in an offset, spaced, parallel relationship one above the other, by relatively small, support means. The normally upper surface of the lower plate is provided, preferably, with a plurality of channels, e.g., multi-directional or parallel grooves over a major portion of its surface.

The plates and spacer support means of the module may be made entirely of glass, or of heat and ultra violet resistant plastic, or a combination of these materials. The rectangular plates of each module are preferably of small size, e.g., of the order of 20×50 cm. to 50×50 cm., have an overall thickness of 2.5-7.5 cm. (including the thickness of the air space) and weigh on the order of 1-5 kg./unit.

A plurality of such modular units are preferably placed in overlapped or shingled fashion, onto the roof of a structure, with the channels of the lower plates of each module forming a plurality of continuous fluid flow paths commencing from upper entrance area to the plurality of modules and terminating in lower exiting areas. The upper plate of each module is preferably made of light translucent glass or plastic and the lower plate, which may be of glass, plastic or metal, is darkened on one surface for heat-absorption purposes. All modular units are affixed to each other in a fluid-tight manner by conventional cementitious materials. Fluid, which may be water, air or other liquids or gases, is then pumped into the continuous space formed between the modular units. Liquids will be passed downwardly by gravity, within the fluid channels of the modules. Gases will be pumped, under pressure, upwardly through the modules for heat absorption. The fluid, whether liquid or gas, is heated by the solar energy impinging upon the modular units, as its passes through the modules.

The heated liquid or gas fluid is collected from the exit end of the modular units, and may be used directly for such purposes as space heating, hot pools—or the heating of swimming pools —or may be returned for further heating depending upon the temperature of the fluid desired and other factors.

The modular units are simple to fabricate, and easy to install. Vent pipes and chimneys and other projections in the roof of building structures do not pose a problem as the modular units can be readily cut, on the job, for a custom fit. Thus, clear span roof areas, required for conventional, relatively large size, e.g., 3'×6' are not necessary. Instrumentation utilized to control fluid flow and temperature through the modular units are conventional.

BRIEF DESCRIPTION OF THE DRAWINGS

FIG. 1 is a perspective view of a solar collector module unit of my invention;

FIG. 2 is a cross-sectional view, in side elevation, of a solar collector system comprising a plurality of solar collector module units of FIG. 1 arranged in shingled relationship on an inclined roof surface, in combination with a fluid collection and fluid transfer means; and FIG. 3 is a fragmentary, cross-sectional view, taken along the line 3—3 of FIG. 2.

DETAILED DESCRIPTION OF THE DRAWINGS

The solar collector module unit of this invention is designated, generally, by the numeral 10. The module unit 10 comprises a first, normally lower plate means 12, an upper plate means 14, and a plurality of spacer support means 16 which maintain the upper and lower plates in spaced generally parallel relationship. The upper and lower plate means 14, 12 as well as the spacer means 16, are all preferably made of glass, the spacer means 16 being cemented to plates 12, 14 by conventional adhesives such as epoxy resins designated by numeral 17. Each plate means 12, 14 is preferably rectangular or square in shape, and has a size of perhaps 20×50 cm. to 50×50 cm. by way of example only. The upper plate is light translucent and functions as the window through which the solar energy enters the space 18 formed between the plate means 12, 14. The under surface 12b of lower plate 12 is preferably smooth and is preferably darkened, or blackened, by the application thereto of a layer or coating of conventional black paint 19. The spacer means 16 projects at approximately right angles with respect to the plane of the plate means 12, 14.

As seen in the drawings, the spacer means 16 are small relative to the dimensions of upper plate 14 and lower plate 12 and are so located as to define substantial openings or substantially entirely open spaces in all sides of space 18 formed between plate means 12, 14.

The upper surface 12a of the lower plate means is provided with a plurality of parallel V-grooves 20 extending over a major or entire portion of said upper surface 12a, these grooves providing channels for the flow of liquid (usually water or perhaps another liquid) through the module unit 10 as will be explained.

Either the undersurface 12b or the upper surface 12a, of the lower plate means 12 may be blackened to provide increased heat absorption properties—but preferably, the undersurface 12b is blackened so that water, to be heated within the module may be employed for drinking or other potable purposes.

The upper plate means 14 has substantially parallel side edges 22a, 22b, and substantially parallel end edges 22c, 22d. The lower plate means 12 also has substantially parallel side edges 24a, 24b, and substantially parallel end edges 24c, 24d. The upper side edges 22a, 22b are preferably offset from lower side edges 24a, 24b (as best seen in FIGS. 1 and 2) whereas the upper and lower end edges 22c, 22d and 24c and 24d, respectively, are not offset from each other. The side edges 22a, 24a, and 22b, 24b are offset in a direction parallel to the grooves or channels 20, the amount of offset designated "X" in FIG. 2, being on the order of 1–2" preferably. The offset enables shingling or overlap joints to be easily made in a direction substantially at right angles to the grooves 20, between adjacent module units, as will be seen in more detail.

A plurality of module units are assembled as shown in FIG. 2, so that the offset side edge 22b of one module 10′ overlaps side edges 22a of a next adjacent module 10″, and side edge 24b of module 10′, overlaps side edge 24a of module 10″. A plurality of overlap joints 30 are thus created which can be readily made airtight and water-tight by the application of adhesive compound, such as any of the conventional epoxy adhesives, in a continuous bead form. The end edges 22c, 24c and 22d, 24d of the modules 10 need only be butt-jointed and cemented by adhesive such as conventional epoxy resins along joint lines 32 as shown in FIG. 3.

The undersurface 12b of each module 10, 10′, 10″ etc. is adhered to the roof structure 40 by conventional adhesive means.

The final arrangement of modules as shown, has a high end H and a low end L. If the fluid to be heated is a liquid, e.g., water, it will be pumped, by pump P, from line 46 or an outside water supply 47, into the high end H of the module assembly, through a conventional header pipe having a uniform hole pattern shown in phantom line 52, FIG. 1 which then distributes the water evenly into the upper end of the plurality of channels 20. The water will trickle down the plurality of channels 20, from the high end H to the low exit end L, by gravity flow, and be heated in its passage therethrough by the radiant solar energy in space 18.

The exiting heated water may be collected in a gutter 42, at the low end L of the module assembly, and passed, via line 45, into an insulated hot water reservoir 44, for later re-use, or may be transferred, via lines 46, 48 through pump P for a further heating pass through the module assembly 10, 10′, 10″ etc.

As one example of the efficiency of the module assembly of this invention, it has been found that water can be heated as much as 25° F., in a single pass, through a conventional rooftop installation. As another example, it has been found that a 500 square foot area of module assemblies 10, 10′ 10″ of this invention will produce a 100,000 BTU's of energy per hour on a sunny day.

The module assembly 10, 10′ 10″ etc, is thus seen to provide a series of fluid flow paths for liquid. It is presently preferred that the grooves 20 can be arranged over a major portion of the upper surface 12a of the lower plate means for greatest heating efficiency, so as to minimize liquid accumulation in depressions in the roof structure 40. That is to say, the continuous channelling, provided by the grooves 20 is an efficient means of providing a series of uniform fluid flow paths over the entire major surface of the lower plate means 12 of each module 10.

The use of a series of parallel V-grooves 20 is particularly advantageous, as the inclined walls of the V-grooves 20 appear to trap solar radiation in an efficient manner, and reduce radiant heat loss through the upper plate 14. Fluid flow paths may be formed by a series of parallel fluid flow channels, as shown. Also, the fluid flow paths may be unidirectional, multi-directional, or even randomly oriented. The channels may be U-shaped, may comprise a series of discrete pockets, or may have still other shapes so long as fluid flow paths are maintained between the entrance and exit ends of the module assemblies 10, 10′, 10″ etc.

While modular units 10 have been shown and described with one pair of upper side edges 22a, 22b, offset from the lower pair of side edges 24a, 24b, respectively, the modular units need not have offset side edges. The same overlap joint arrangement can be effected, as shown in FIG. 2, without the offset. In each instance, the amount of overlap is dictated by the amount of inset of the spacer means 16 from the side edges, as clearly seen in FIG. 1, the ends of the spacer means serving as stop means for the overlapping plate means of the adjacent module.

It is also possible to eliminate gutter 42 by providing the lowermost modules 10 with a baffle wall of glass or other material (shown in phantom by the numeral 50 in FIG. 2) which runs from end to end of each module 10 and are cemented to each other. The module nearest the downspout 52 would not carry a baffle wall 50 and the liquid will then be backed up in the bottom modules and caused to flow directly into downspout 52 and thence into reservoir 44, and elsewhere in the system as needed.

If air is to be heated, the same solar collector module 10, 10′, 10″ etc. may be employed but in conjunction with conventional air blowers blowing air, under pressure, into the low end of the module collector assembly 10, 10′ etc. and being heated in its upward travel, through the said assembly. The heated air is then transferred from the top exit end H of the modules, for heating purposes, e.g., to heat water or for space heating.

Conventional instrumentation may be employed to control air or liquid flow as sun conditions vary, or in accordance with temperature conditions desired.

It will be noted that three slightly different types of modules may be employed, the modules being designated as a header module which comprises the basic module 10 shown in FIG. 1 but with a header pipe 52 (shown in phantom) affixed thereto, the basic module 10 itself and the bottom module 10‴ which incorporates the baffle wall 50 into the basic module.

While various preferred embodiments of this invention have been shown and described, as well as several modifications thereof, other modifications will occur to those skilled in the art. Hence, I intend to be bound only by the claims which follow.

I claim:
1. A solar collector module which comprises:
 a first plate means, of predetermined width and length dimensions, having a plurality of fluid flow paths formed in a major surface thereof;
 a second plate means having substantially the same width and length dimensions as said first plate and being spaced from, and overlying said first plate means; and
 spacer means affixed to and between said first and second plate means for maintaining said first and second plate means in spaced relationship with said major surface of said first plate means lying adjacent the said second plate means, said spacer means being of such small dimensions relative to the length and width dimensions of said first and second plate means as to define substantial openings in all sides between said first plate means and said second plate means.

2. The solar collector module of claim 1 having a header pipe affixed thereto for distribution of liquid uniformly into said fluid flow paths.

3. A solar collector module which comprises:
a first plate means, of predetermined width and length dimensions, having a plurality of channels formed in a major surface thereof;
a second plate means having substantially the same width and length dimensions as said first plate and being spaced from, and overlying said first plate means; and
spacer means affixed to and between said first and second plate means for maintaining said first and second plate means in spaced relationship with said channelled surface of said first plate means lying adjacent the said second plate means, said spacer means being of such small dimensions relative to the length and width dimensions of said first and second plate means as to define substantial openings in all sides between said first plate means and said second plate means.

4. The solar collector module of claim 3 wherein one of said first or second plate means is darkened on one surface thereof, and the other plate means is light translucent.

5. The solar collector module of claim 3 wherein said first plate means is composed essentially of glass, and the reverse surface of said first plate means is darkened to increase solar energy absorption onto said first plate means.

6. The solar collector module of claim 3 wherein said second plate means is composed essentially of translucent glass.

7. The solar collector module of claim 3 wherein said spacer means is composed essentially of a plurality of glass elements projecting at approximately right angles with respect to said major surface of said first plate means.

8. The solar collector module of claim 3 wherein said first and second plates are offset, with respect to each other, in one only of said width and length dimensions.

9. The solar collector module of claim 3 wherein said channels are formed by a series of parallel grooves.

10. The solar collector module of claim 3 wherein a header pipe is affixed thereto for distribution of liquid uniformly into said plurality of channels.

11. A solar collector system, which comprises:
a plurality of solar collector modules each of which modules includes a first plate means of given width and length dimensions having a plurality of fluid flow path means formed in one surface thereof, a second plate means having substantially the same width and length dimensions as said first plate means, and spacer means affixed to and between said first and second plate means for maintaining said first and second plate means in spaced relationship with said one surface of said first plate means lying adjacent the said second plate means, said spacer means being of such small dimensions relative to the length and width dimensions of said first and second plate means as to define substantial openings in all sides between said first plate means and said second plate means; and
each of said modules being contiguously arranged with respect to other modules so that the flow path means of said plurality of modules form a continuous fluid flow path through said solar collector modules.

12. The solar collector system of claim 11 wherein each of said modules is affixed to contiguous modules by fluid-tight adhesive means.

13. The solar collector system of claim 11 wherein said fluid flow path means are formed by a series of parallel grooves whereby said plurality of contiguously arranged modules are provided with a substantially continuous series of parallel grooves over the entire plurality of said solar collector modules.

14. The solar collector system of claim 11 wherein said first and second plates of each module are offset, with respect to each other, in one only of said width and length dimensions.

15. The solar collector system of claim 11 wherein each of said modules overlaps adjacent modules and each of the overlapping edges of said modules are affixed to each other by fluid-tight adhesive means.

16. The solar collector system of claim 11 wherein said contiguously arranged plurality of collectors have a high end and a low end;
fluid transfer means for transferring liquid to the high end of each of said solar collector modules;
means for collecting said liquid exiting from the lower end of said solar collector modules; and
means for returning at least a portion of said exiting liquid to said fluid transfer means.

17. The solar collector system of claim 11 wherein said contiguously arranged plurality of collectors have a high end and a low end;
fluid transfer means for transferring air to the low end of each of said solar collector modules;
means for collecting said air exitting from the high end of said solar collector modules; and
means for returning at least a portion of said exitting air to said fluid transfer means.

18. The solar collector module of claim 11 wherein one of said first or second plate means is darkened on one surface thereof, and the other plate means is light translucent.

19. The solar collector module of claim 11 wherein said first plate means is composed essentially of glass, and the reverse surface of said first plate means is darkened to increase solar energy absorption onto said first plate means.

20. The solar collector module of claim 11 wherein said second plate means is composed essentially of translucent glass.

21. The solar collector module of claim 11 wherein said spacer means is composed essentially of a plurality of glass elements projecting at approximately right angles with respect to said major surface of said first plate means.

* * * * *